US008856916B1

(12) United States Patent
Sobel

(10) Patent No.: US 8,856,916 B1
(45) Date of Patent: Oct. 7, 2014

(54) USER ASSOCIATED GEO-LOCATION BASED REAUTHORIZATION TO PROTECT CONFIDENTIAL INFORMATION

(71) Applicant: William E. Sobel, Jamul, CA (US)

(72) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/646,586

(22) Filed: Oct. 5, 2012

(51) Int. Cl.
*G06F 12/14* (2006.01)
(52) U.S. Cl.
USPC .............................................. 726/17; 726/26
(58) Field of Classification Search
USPC ..................................................... 726/17, 26
See application file for complete search history.

(56) References Cited

U.S. PATENT DOCUMENTS

| 6,577,274 | B1 * | 6/2003 | Bajikar ......................... 342/450 |
| 7,792,482 | B2 * | 9/2010 | Walker et al. ................ 455/3.02 |
| 2003/0105971 | A1 * | 6/2003 | Angelo et al. ................ 713/200 |
| 2004/0172535 | A1 * | 9/2004 | Jakobsson et al. ............ 713/168 |
| 2008/0107274 | A1 * | 5/2008 | Worthy .......................... 380/278 |
| 2009/0222669 | A1 * | 9/2009 | Huang et al. .................. 713/182 |

* cited by examiner

*Primary Examiner* — William Powers
(74) *Attorney, Agent, or Firm* — Brill Law Office; Jeffrey Brill

(57) ABSTRACT

In response to a trigger indicating to prevent access to confidential information on a specific user's mobile device, access is prevented to all parties, until a successful reauthorization occurs. Preventing access can comprise storing encrypted confidential information and removing the decryption key. In order to subsequently access the confidential information, a reauthorization attempt is made. The current geo-location of the mobile device at the time of the attempt is compared to at least one authorized geo-location associated with the specific user. In response to a) the password and user identifier being correct and to b) the current geo-location of the mobile computing device being an authorized geo-location associated with the specific user, the attempt to reauthorize is successful, whereas otherwise the attempt is unsuccessful. Only in response to a successful attempt is access to the confidential information re-allowed.

20 Claims, 5 Drawing Sheets

USER ASSOCIATED GEO-LOCATION BASED REAUTHORIZATION TO PROTECT CONFIDENTIAL INFORMATION

TECHNICAL FIELD

This disclosure pertains generally to computer security, and more specifically to permitting reauthorization to access confidential information on a computing device only at specific geo-locations associated with a user.

BACKGROUND

At border crossings of many jurisdictions, including, for example, those of the United States, the European Union and China, customs agents have a broad level of authorization to examine the electronic devices of people entering the country, even without suspicion of wrong doing. Electronic devices that can be examined include items such as laptop computers, tablets and phones. These devices frequently store confidential information, for example proprietary corporate data, medical documents, family photographs, website browsing histories, etc. In many industries, a traveler may have a contractual obligation to protect the confidentiality of information on an electronic device, such as medical records, non-published research or company trade secrets. Despite this, travelers are limited in their legal rights to refuse to turn over passwords and other electronic device access control mechanisms to border agents.

The US Customs and Border Patrol (CBP) is aware that its agents may encounter privileged or sensitive information, but the CBP does not publish its procedures for retaining and/or safeguarding it. Furthermore, when the CBP encounters difficulties accessing data on a device (e.g., technical difficulties, encrypted files or documents in a language not known by the agent), the CBP is authorized to hold the device or physically transfer it to another government agency for access assistance. The policies of the other agencies for handling confidential data are also unknown, and in such instances the device is typically not returned to the owner for about five days. Similarly, Immigration and Customs (ICE) agents also may hold and inspect electronic devices, even without individualized suspicions, and typically return devices within 30 days. Similar and in some cases more severe issues exist at border crossings into other countries.

Confidential information can be locked based on location or time. Using a location based lock (a technique called geo-fencing), access to certain information is blocked in certain locations. A typical example would be where a user travels to a given country in which it is believed the authorities may attempt to obtain private and confidential information from the user. Therefore, the user's computing device is configured to automatically make the confidential data inaccessible in that country (i.e., a geo-fence for the country is created). The geo-fence remains in effect until the computing device is no longer in the country. A time based lock makes the information inaccessible for a given period of time, for example three days.

It might initially seem that simply creating a geo-fence for the border crossing areas would provide sufficient protection for the confidential information of a computing device. However, the device can be held by the border agents and transported (or a copy of the data transferred) to other agencies not physically located in the border area, and thus outside of the geo-fence. It is not practical or even possible to create a geo-fence for every area to which the device could be shipped, because all such locations cannot not known to the user, and the device could be shipped offshore. Therefore, a simple location based lock is insufficient to protect the contents of the device. Furthermore, a time based lock is also insufficient, because the device can be held until the time based lock expires.

It would be desirable to address these issues.

SUMMARY

Unauthorized access to confidential information stored on a specific user's mobile computing device is blocked, even to a party that has physical control of the mobile computing device and knows any user identifiers and passwords associated with accessing the confidential information. A trigger indicating to prevent access to the confidential information on the mobile computing device is received. In one embodiment, the trigger is generated in response to receiving user input indicating to execute a confidential information protection process. In other embodiments, the trigger is generated automatically, for example in response to determining that the mobile computing device is located within a specific proximity to an insecure location. In response to receiving the trigger, access to the confidential information on the mobile computing device is prevented to all parties, until a successful reauthorization from an authorized, geo-location associated with the specific user has occurred. Preventing access to the confidential information on the mobile computing device can comprise programmatically preventing any party from reading and/or executing confidential information on the mobile computing device. This can comprise storing confidential information on the mobile computing device in encrypted form, and removing the key required to decrypt the encrypted confidential information. The removal of the decryption key can comprise physically removing the key from the mobile computing device, or programmatically making the key inaccessible.

In order to subsequently access the confidential information on the mobile computing device, an attempt to reauthorize is made. Such an attempt to reauthorize is only successful responsive to the current geo-location of the mobile computing device at the time of the attempt being an authorized geo-location associated with the specific user. An authorized geo-location associated with the specific user can be in the form of a geo-location to which the specific user has access but that is not publically accessible, and at which it has been pre-determined that the specific user is permitted to reauthorize and thus access otherwise un-accessible confidential information on the mobile computing device. Examples of such locations are the user's home, the user's office, a specific field office at which the user is scheduled to work during a specific business trip and a specific hotel at which the user is scheduled to stay during a specific trip. Responsive to changes concerning the specific user (e.g., the user moves, is transferred, completes one business trip or starts another), authorized geo-locations associated with the user can be added, edited and/or deleted.

Returning to the discussion of attempting to reauthorize, such an attempt can be made in response to receiving a user directive. The current geo-location of the mobile computing device at the time of the attempt to reauthorize is determined. In one embodiment, a reauthorization request comprising a user identifier, associated password and the current geo-location of the mobile computing device is transmitted to a remote computer, such as a central server. In response to a) the password and user identifier being correct and to b) the current geo-location of the mobile computing device at the time of the attempt to reauthorize being an authorized geo-location associated with the specific user, an indication that the attempt to reauthorize is successful is received from the remote computer. On the other hand, in response to the current geo-location of the mobile computing device not being an authorized geo-location associated with the specific user, an indication that the attempt to reauthorize is not successful is received.

In another embodiment, rather than transmitting a reauthorization request to a remote computer, the attempt to reauthorize is performed locally on the mobile computing device. In this embodiment, the current geo-location of the mobile computing device at the time of the attempt to reauthorize is locally compared to at least one authorized geo-location associated with the specific user. In response to a) the password and user identifier being correct and to b) the current geo-location of the mobile computing device at the time of the attempt to reauthorize being an authorized geo-location associated with the specific user, the attempt to reauthorize is adjudicated as successful, whereas otherwise the attempt is adjudicated as unsuccessful.

Only in response to the attempt to reauthorize being successful is access to the confidential information on the mobile computing device re-allowed. Re-allowing access to the confidential information can comprise providing the key required to decrypt encrypted confidential information, responsive to the current geo-location of the mobile computing device at the time of the attempt to reauthorize being an authorized geo-location associated with the specific user, either by receiving a transmission of the key from the remote computer, or by programmatically making the key accessible locally on the mobile computing device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
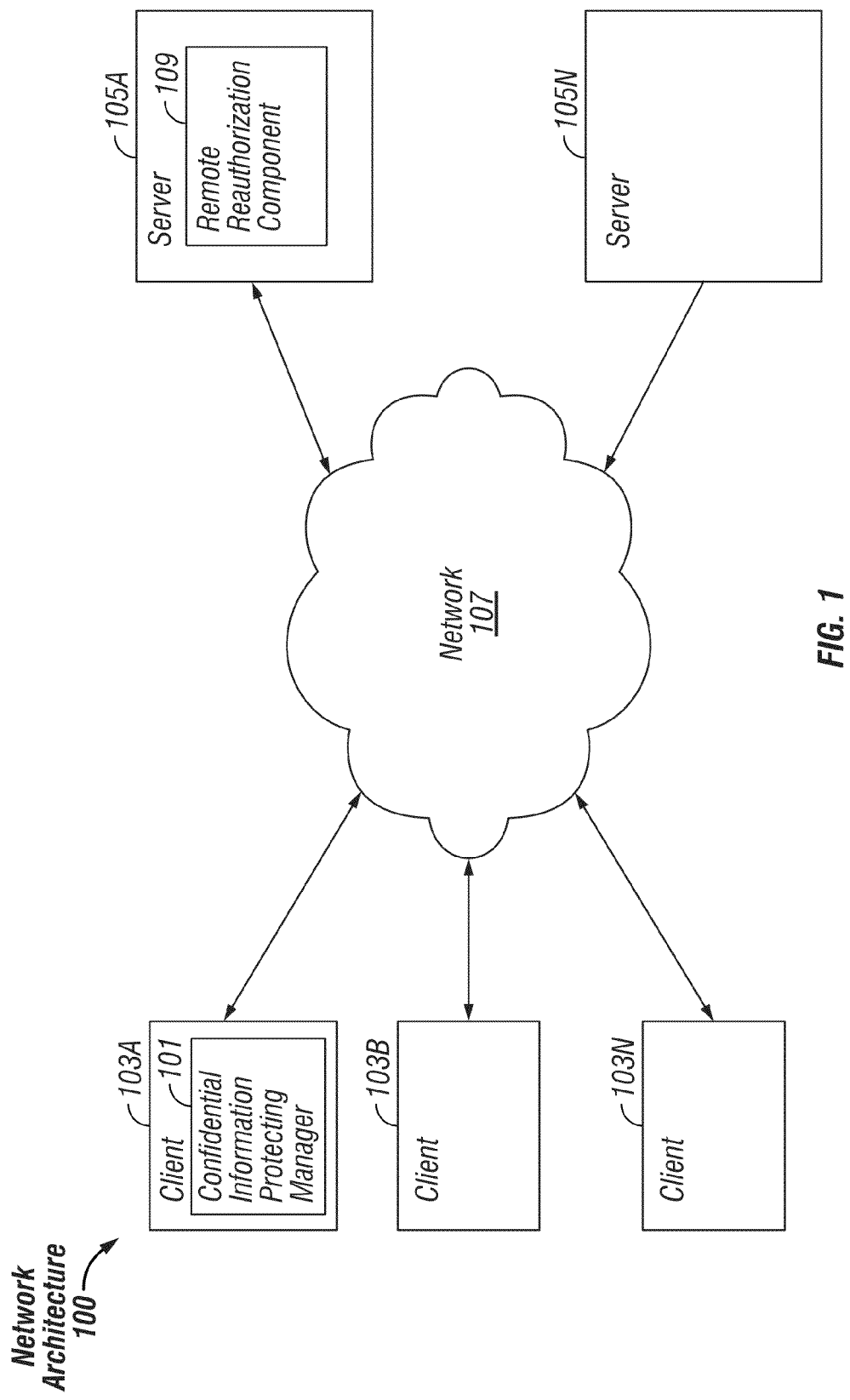
FIG. 1 is a block diagram of an exemplary network architecture in which a confidential information protecting manager can be implemented, according to some embodiments.

FIG. 1 is a block diagram illustrating an exemplary network architecture 100 in which a confidential information protecting manager 101 can be implemented. The illustrated network architecture 100 comprises multiple clients 103A, 103B and 103N, as well as multiple servers 105A and 105N. In FIG. 1, the confidential information protecting manager 101 is illustrated as residing on client 103A, with a remote reauthorization component 109 on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
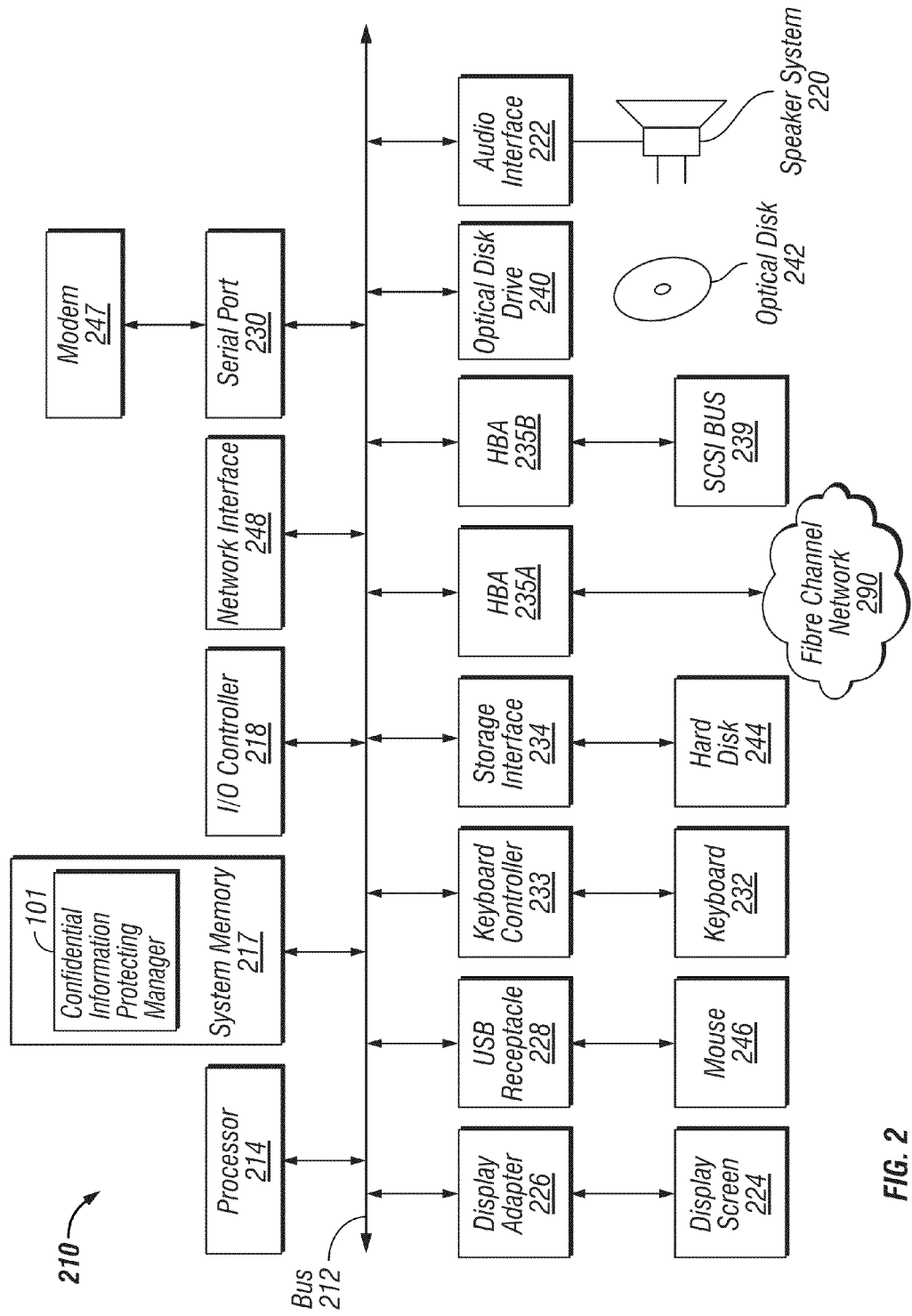
FIG. 2 is a block diagram of a computer system suitable for implementing a confidential information protecting manager, according to some embodiments.

FIG. 2 is a block diagram of a computer system 210 suitable for implementing a confidential information protecting manager 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the confidential information protecting manager 101 is illustrated as residing in system memory 217. The workings of the confidential information protecting manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
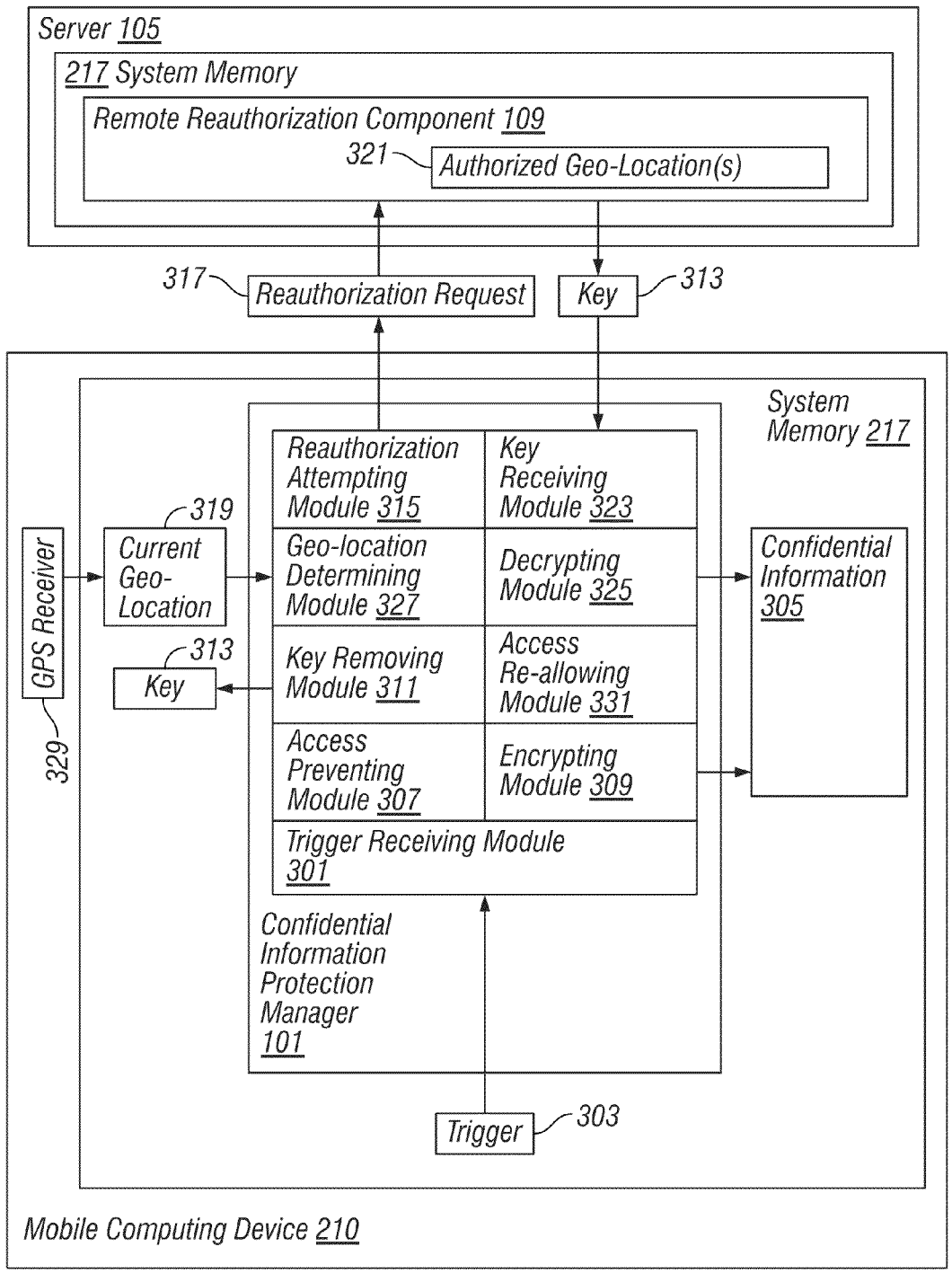
FIG. 3 is a block diagram of the operation of a confidential information protecting manager, according to some embodiments.
Figure 4:
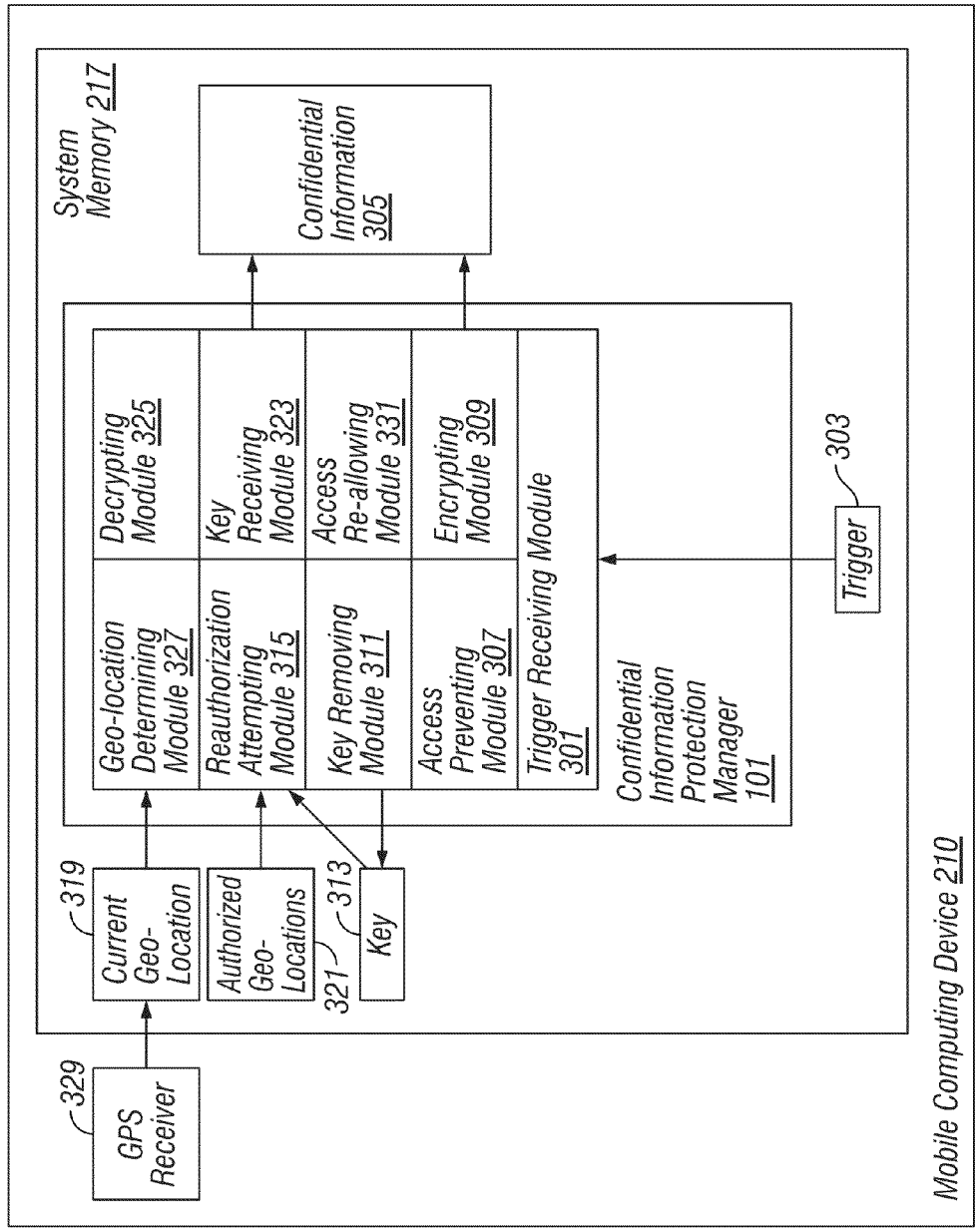
FIG. 4 is a block diagram of the operation of a confidential information protecting manager, according to other embodiments.

FIG. 3 illustrates a confidential information protecting manager 101 running in the system memory 217 of a client computer 103 (such as a mobile computing device 210), with a remote reauthorization component 109 running in the system memory 217 of a server computer 105, according to some embodiments. As described above, the functionalities of the confidential information protecting manager 101 can reside on a client 103 (including but not limited to a client 103 in the form of a mobile computing device 210), a server 105, or be distributed between multiple computer systems 210, including within a cloud-based computing environment in which the functionality of the confidential information protecting manager 101 is provided as a service over a network 107. It is to be understood that although the confidential information protecting manager 101 is illustrated in FIG. 3 as a client-side entity with a server-side component, the illustrated confidential information protecting manager 101 represents a collection of functionalities, which can be instantiated as a single or multiple modules on one or more computing devices 210 as desired. In different embodiments, the functionalities of the confidential information protecting manager 101 are distributed and/or instantiated in different ways. For example, whereas FIG. 3 illustrates an embodiment in which a component 109 on the server 105 is implemented on an external server 105, FIG. 4 illustrates a different embodiment without any server-side components, in which all of the functionality of the confidential information protecting manager 101 is implemented on a mobile computing device 210. It is to be understood that the modules of the confidential information protecting manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the confidential information protecting manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a confidential information protecting manager 101 prevents unwanted access to confidential information 305 on a computing device 210 by allowing the user to initiate a protected state, in which the confidential information 305 cannot be accessed until a successful reauthorization is performed. In order to successfully reauthorize, the computing device 210 must be physically located in a non-public, authorized geo-location 321 associated with the specific user, such as the user's home or office. Any attempt to reauthorize from anywhere other than such an authorized location 321 associated with the specific user is denied, even if the appropriate password or reauthorization code is supplied. This prevents access to the confidential information 305, even to a party which has compelled the user to disclose all known passwords and access codes. If such a party physically confiscates the computing device 210 and transports it to other locations, because the non-public authorized user associated locations 321 are not accessible to the confiscating party, the confidential information 305 remains inaccessible. This enables the user to turn over the computing device 210 and whatever passwords and reauthorization codes s/he knows, without compromising the confidential information 305 stored on the device 210.

To implement such functionality, a trigger receiving module 301 of the confidential information protecting manager 101 receives a trigger 303 indicating to prevent access to confidential information 305 on the computing device 210 until the computing device 210 is physically located at an authorized geo-location 321 specifically associated with the user. As the term is used herein "authorized geo-location associated with a specific user" means a geo-location to which the specific user has access but that is not publically or generally accessible, and at which it has been pre-determined that the specific user is permitted to reauthorize and thus access otherwise un-accessible confidential information 305. Examples of such authorized geo-locations 321 associated with a specific user are the user's home and office, (or a specific field office or hotel when the user is traveling). The use of authorized user associated geo-locations 321 is described in greater detail below. In some embodiments, the above-noted trigger 303 is initiated by the user. In such embodiments, the user can enter input indicating to execute the confidential information 305 protection process. Such user entered input can comprise the user selecting a corresponding graphical user interface component (e.g., clicking on a button or other menu item), entering a command through a menu or command line, operating a hardware switch or button, etc. In response to the user entered input, the trigger 303 is generated and communicated to the trigger receiving module 301, thereby indicating to the confidential information protecting manager 101 to initiate the prevention of access to the confidential information 305. The trigger 303 can be instantiated in the form of a software or hardware control signal. The user can initiate the trigger 303 when approaching a border crossing, or when otherwise anticipating a situation in which it is desirable to prevent access to confidential information 305 until the computing device 210 is physically located in an authorized geo-location 321 associated with the user. In other embodiments, the trigger 303 is automatically generated without input from the user of the computing device 210. In such embodiments, the trigger 303 can be automatically generated responsive to different events, such as determining that the computing device 210 is located within a given proximity to a border crossing or other designated (insecure) location, detecting a transmission on a given frequency or containing specific content known to be associated with a border crossing or other situation warranting access prevention, detecting a non-trusted attempt to access confidential information 305, receiving a control signal from a remote computer such as a central server 105, etc.

Responsive to the receipt of the trigger 301, an access preventing module 307 of the confidential information protecting manager 101 prevents access of confidential information 305 on the computing device 210 by any party, until the device 210 is physically located in an authorized user associated geo-location 321, and a successful re-authorization from such a user associated geo-location 321 has occurred. It is to be understood that as used herein, the term "confidential information" can comprise any content on the computing device 210 so designated. For example, in some embodiments, a subset of the data stored on the computing device 210 is designated as being confidential information 305, and the access preventing module 307 prevents access to that data, but not to other data stored on the computing device 210. For example, specific word processing documents and spreadsheets containing privileged corporate data stored on the computing device 210 could be designated as confidential, whereas, e.g., the user's music files, the executable file for a conventional web browser and/or help files containing documentation describing how to use a conventional office productivity suite would not be. In some embodiments, confidential information 305 is not limited to human-readable data, but can also or instead be in the form of one or more executable computer programs. For example, a confidential beta version of an executable program installed on a developer's computing device 210 can be classified as confidential information 305, in addition to the corresponding source code that when compiled and linked results in the executable file. In some embodiments, the default status of information on the computer can (but need not be) non-confidential, such that only specific content explicitly designated as being confidential information 305 has that status. Preventing access to confidential information 305 can comprise programmatically preventing any party from reading and/or executing confidential information 305 on the computing device 210. In one embodiment, all of the content stored on the computing device 210 is considered confidential, and thus preventing access to confidential information 305 results in preventing access to all content stored on the computing device 210. The implementation of preventing access to confidential information 305 under various embodiments is discussed in greater detail below.

In order to facilitate prevention of the accessing of confidential information 305, in some embodiments, confidential information 305 is always stored in an encrypted state, and decrypted only to facilitate an authorized access. In these embodiments, responsive to the trigger 301 indicating to prevent access to the confidential information 305, a key removing module 311 of the confidential information protecting manager 101 removes the key 313 required to decrypt the encrypted confidential information 305 from the computing device 210, such that the encrypted confidential information 305 cannot be decrypted without re-obtaining the key 313. In other embodiments, some or all confidential information 305 is stored in the clear by default, and encrypted responsive to the receipt of the trigger 301 indicating to prevent access to the confidential information 305. More specifically, in embodiments in which confidential information 305 is stored in the clear, an encrypting module 309 of the confidential information protecting manager 101 encrypts confidential information 305 and the key removing module 311 removes the decryption key 313, responsive to the trigger 301. In either case, different ciphers can be used to encrypt the confidential information (e.g., by the encrypting module) 309 in different embodiments as desired, such as a symmetric-key algorithm (for example, Twofish, Serpent, AES, Blowfish, CAST5, RC4, 3DES, IDEA, etc.) or an asymmetric-key algorithm (for example, RSA, Diffie-Hellman, Cramer-Shoup, DSA, etc.).

In the embodiments of FIG. 3, the key 313 is re-obtained from a remote source as part of the reauthorization process, which is described below. (In a different embodiment described in conjunction with FIG. 4, the key 313 is not physically removed from the computing device 210 and re-obtained from a remote source, but instead made inaccessible and subsequently made re-accessible locally.) Note that in symmetric key embodiments, the key 313 is in the form of the single key 313 used both to encrypt and decrypt data, whereas in asymmetric-key embodiments, the removed key 313 is the private key, which is the key used for decryption. To remove the key 313 from the computing device 210, the key removing module 311 typically does more than mark the key 313 as being deleted in the file system in such a way that the underlying content of the key 313 is still present on the storage media and is thus recoverable. Instead, the key removing module 311 actually removes the content of the key 313 from the storage media, for example by marking it as deleted and then overwriting the location on the media containing the content with, e.g., "noise" such as alternating ones and zeros. Once the confidential information 305 is encrypted and the key 313 is removed from the computing device 210, the confidential information 305 is in effect not accessible. The encrypted content is not readable by a person, nor can it be executed by a computer without being decrypted. Thus, until the key is recovered by a successful reauthorization, access to the confidential information 305 by any party is prevented.

In one embodiment, rather than removing the key 313 in a temporally proximate response to the trigger 301, the key removing module 311 waits until an attempt to access confidential information 305 after receiving a trigger 301 but prior to a permitted reauthorization, and then removes the key 313, thus preventing the access at the time it is attempted. From that point until a successful reauthorization occurs, the encrypted data cannot be accessed.

In order to regain access to the encrypted confidential information 105, a reauthorization attempting module 315 of the confidential information protecting manager 101 attempts to reauthorize to access the confidential information 305 on the mobile computing device 210. In the embodiments of FIG. 3, the reauthorization attempting module 315 transmits a reauthorization request 317 to the remote reauthorization component 109 on the server 105. Typically, a reauthorization request 317 is transmitted responsive to receiving a directive from the user to reauthorize, as indicated by, for example, a control signal resulting from user input such as the selection of a corresponding user interface component. A reauthorization request 317 includes the current geo-location 319 of the computing device 210. A geo-location determining module 327 of the confidential information protecting manager 101 automatically determines the current geo-location 319 of the computing device 210, for example by using a Global Positioning System ("GPS") receiver 329 on the computing device 210, WiFi triangulation and/or cell tower triangulation. The reauthorization request 317 typically also includes an identifier of the user and an associated password, which are typically input by the user (or, in one embodiment, stored on the computing device 210).

In response to receiving a reauthorization request 317 from a computing device 210, the server-side remote reauthorization component 109 compares the current geo-location 319 of the computing device 210 to one or more pre-determined authorized geo-locations 321 associated with the specific user, at which the given user is permitted to reauthorize. If the current geo-location 319 of the computing device 210 is an authorized geo-location 321 at which the user is permitted to reauthorize (and the user identifier and password in the reauthorization request 317 are correct), then the remote reauthorization component 109 responds to the reauthorization request 317 by transmitting an indication to the computing device 210 that the attempt to reauthorize is successful. In encryption based embodiments, the indication includes the decryption key 313 210, typically transmitted using a secure communication protocol such as SSL. On the other hand, if the current geo-location 319 of the computing device 210 is not an authorized user associated geo-location 321, the remote reauthorization component 109 denies the reauthorization request (i.e., transmits an indication to the computing device 210 that the attempt to reauthorize is not successful, and does not transmit the decryption key 313).

An access re-allowing module 331 of the confidential information protecting manager 101, re-allows access to the confidential information 305 on the mobile computing device 210, only in response to the attempt to reauthorize being successful. More specifically, in encryption based embodiments, when the remote reauthorization component 109 transmits the decryption key 313 to the computing device 210, a key receiving module 323 of the confidential information protecting manager 101 receives the key 313. A confidential information decrypting module 325 of the confidential information protecting manager 101 can then utilize the key 313 to decrypt the encrypted confidential information 305, thereby providing the user with access.

As noted above, the remote reauthorization component 109 denies any reauthorization requests 317 transmitted from anywhere other than a specific, user associated authorized geo-location 321 such as the user's office or hotel room, including reauthorization requests 317 that include the user's password or reauthorization code. As noted above, this enables the user to comply with all legal obligations to provide the computing device 210 and all password/authorization information to border agents or other government personal, without enabling undesired access of the confidential information 305. This is so because the user (or other parties) cannot reauthorize from anywhere other than authorized user associated geo-locations 321, and these user associated geo-locations are not accessible to government personal or other third parties, even with the password. Even if the computing device 210 is held and transported to other government agencies, no set of credentials will enable reauthorization until the computing device 210 is physically located at one the authorized user associated geo-locations 321. Additionally, the border agents can copy the encrypted data to storage media (e.g., a CD or memory stick) which can be shipped to other facilities, but this encrypted data will remain inaccessible.

It is to be understood that the use of the confidential information protecting manager 101 is not limited to protecting confidential information at border crossings. The confidential information 305 protecting manager 101 can be utilized to prevent access of confidential information 305 under any circumstances under which the user could be compelled to provide physical access to the computing device 210 and provide passwords (e.g., a country in which the authorities have such power, a neighborhood in which armed robbery might occur, etc.). During any such scenario, the user can initiate the trigger 303 for the confidential information protecting manager 101 to make the confidential information inaccessible. As described above, the confidential information protecting manager 101 then prevents reauthorization and access of the confidential information 305 on the computing device 210 until the computing device 210 is physically located in an authorized geo-location 321 associated with the user. Because these authorized geo-locations 321 associated with the user are not accessible to the party that confiscated the computing device 210, the confiscating party is not able to access the confidential information 305, even if the user discloses all known passwords, reauthorization codes, etc.

It is to be understood that in the embodiments of FIG. 3, the authorized geo-locations 321 associated with the user are maintained by the server-side remote reauthorization component 109, as opposed to locally on the user's computing device 210. In some embodiments, the values of the authorized geo-locations 321 associated with the user are set by the enterprise or organization for which the user works. In such an embodiment, an authorized party such as a manager or systems administrator can input and edit the authorized geo-locations 321 at an enterprise level. In some embodiments, a user can input and edit self-associated authorized geo-locations 321 from the mobile computing device 210, but only when the computing device 210 is not in the protected state in which confidential information 305 cannot be accessed. Otherwise, the border agent or other party under whose jurisdiction or physical control the user finds himself could compel the user to set the current location 319 to an authorized location 321, and gain access to the confidential information 305. Thus, once the computing device 210 is in the protected state, it can only be reauthorized from an authorized user associated geo-location 321 that has been set prior to entering the protected state, or (in some embodiments) an authorized geo-location 321 set remotely. Some authorized geo-locations 321 associated with the user are short term in nature (i.e., a specific hotel where the user is scheduled to stay on a given business trip), and would typically be set for the trip and deleted afterwards. Other user associated authorized geo-locations 321 are longer term, such as the user's residence or office. However, longer term authorized geo-locations 321 can also be edited and deleted, for example when the user moves, or is transferred between offices.

FIG. 4 illustrates the operation of the confidential information protecting manager 101 according to embodiments without a server-side component. The confidential information protecting manager 101 in the embodiment illustrated in FIG. 4 runs in the system memory 217 of a mobile computing device 210, and contains the same modules described above in conjunction with FIG. 3. In the FIG. 4 embodiments, the triggering module 301, access preventing module 307, encrypting module 309, confidential information decrypting module 325, geo-location determining module 327 and access re-allowing module 331 and operate as described above in conjunction with FIG. 3. However, the key removing module 311, reauthorization attempting module 315 and key receiving module 323 work differently, as described below.

In contrast to the embodiments of FIG. 3, in the FIG. 4 embodiments the key removing module 311 does not physically remove the decryption key 313 from the computing device 210 as described above, but instead programmatically makes the key 313 inaccessible to any user until the reauthorization process occurs. Making the key 313 inaccessible without physically removing it from the computing device 210 can comprise encrypting the key 313 such that the key required to decrypt it is not made accessible to any user. In other embodiments, the key removing module 311 programmatically denies attempts to access the key 313 in other ways. For example, in one embodiment the key removing module 311 intercepts attempts to access the file system, and blocks any attempt to access the key 313. In another example embodiment, the key removing module 311 adjusts the system level access privileges to make the key 313 inaccessible to users. These are just examples, and in other embodiments the key 313 can be made inaccessible to users in other ways. In effect, the key removing module 311 removes access to the key 313, without actually removing the key 313 itself from the computing device 210.

In the FIG. 4 embodiments, instead of transmitting a reauthorization request 317 to the remotely located reauthorization component 109, the reauthorization attempting module 315 performs the reauthorization functionality locally, on the mobile computing device 210. As described above, the user can enter a directive indicating to reauthorize, which can include a user identifier and an associated password. In response, the reauthorization attempting module 315 compares the current geo-location 319 of the computing device 210 (as determined by the geo-location determining module 327 as described above) to the one or more pre-determined authorized geo-locations 321 associated with the specific user, at which the given user is permitted to reauthorize. If the current geo-location 319 of the computing device 210 is one of the authorized geo-locations 321 at which the user is permitted to reauthorize (and the entered user identifier and password are correct), the reauthorization attempting module 315 adjudicates the attempt to reauthorize as being successful. In this case, the reauthorization attempting module 315 can make the decryption key 313 available to the key receiving module 323, such that the decrypting module 325 can decrypt the confidential information 305. In other words, in the embodiments of FIG. 4, rather than receiving the decryption key 313 from the server-side remote reauthorization component 109, the key receiving module 323 receives it from the local reauthorization attempting module 315, which programmatically makes the previously inaccessible decryption key 313 re-accessible. The reauthorization attempting module 315 does this by ceasing or undoing the embodiment specific measures to make the key 313 inaccessible taken by the key removing module 311 (e.g., by decrypting the key 313, ceasing to intercept attempts to access the file system, resetting the system level access privileges to allow access to the key 313, etc.). If the current geo-location 319 of the computing device 210 is not an authorized geo-location 321 associated with the user, the reauthorization attempting module 315 adjudicates the attempt to reauthorize as being unsuccessful, and hence does not make the decryption key 313 re-accessible, and hence the confidential information 305 cannot be decrypted or accessed.

In the embodiments of FIG. 4, the authorized geo-locations 321 associated with the user are maintained locally on the mobile computing device 210. In some such embodiments, the values of the authorized geo-locations 321 associated with the user are set remotely, e.g., by an authorized party at the enterprise or organization for which the user works. In some embodiments, the user can input and edit self-associated authorized geo-locations 321 from the mobile computing device 210 when it is not in a protected state in which confidential information 305 cannot be accessed.

Figure 5:
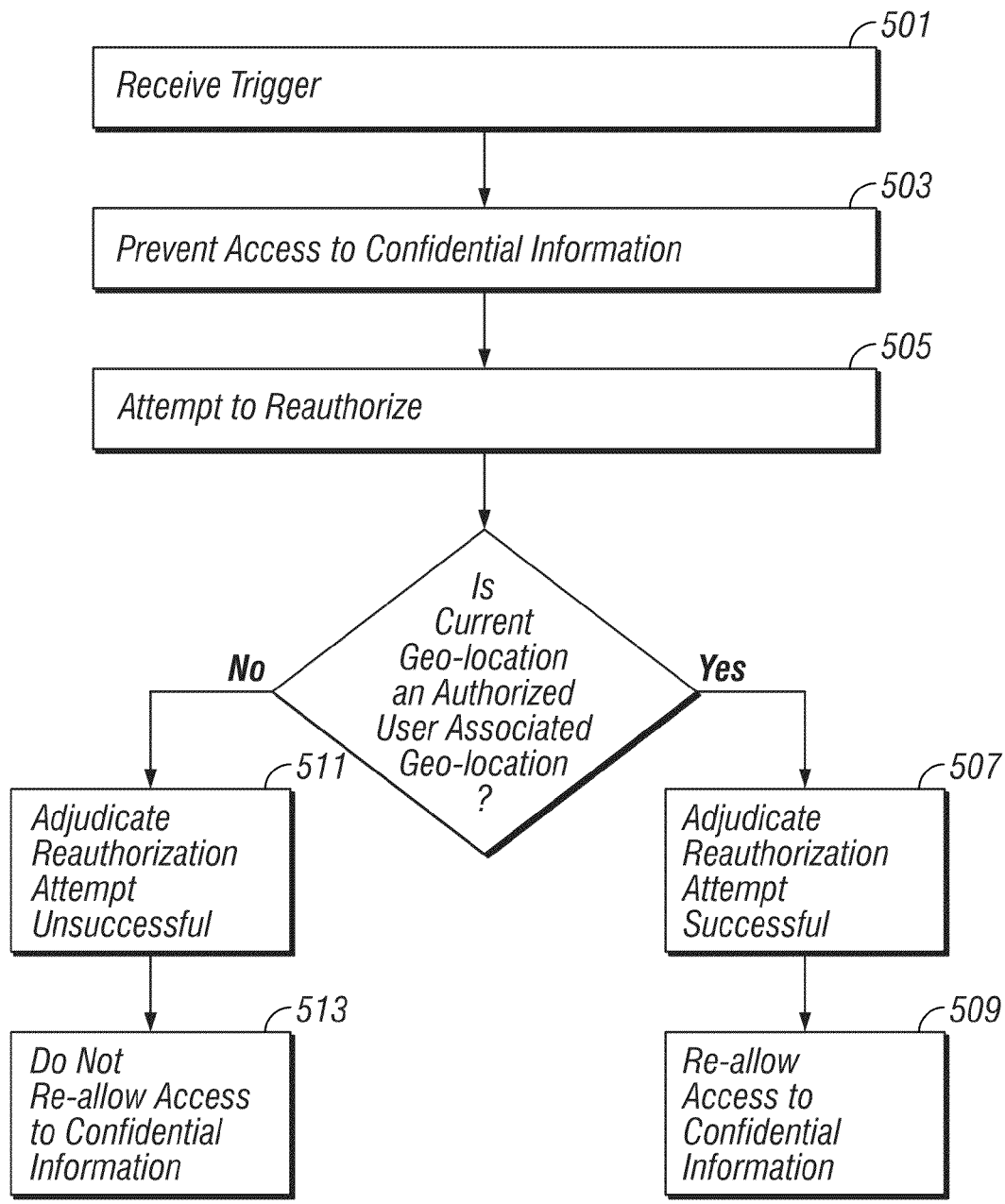
FIG. 5 is a flowchart of the operation of a confidential information protecting manager, according to some embodiments.

FIG. 5 is a flowchart showing steps of the operation of the confidential information protecting manager 101, according to some embodiments. The trigger receiving module 301 of the confidential information protecting manager 101 receives 501 a trigger 303 indicating to prevent access to the confidential information 305 on the mobile computing device 210. Responsive to receiving the trigger 303, the access preventing module 307 prevents 503 access to the confidential information 305 on the mobile computing device 210 by any party. The reauthorization attempting module 315 attempts 505 to reauthorize to access the confidential information 305 on the mobile computing device 210. Responsive to the current geo-location 319 of the mobile computing device 210 at the time of the attempt to reauthorize being an authorized geo-location 321 associated with the specific user, the reauthorization attempt is adjudicated 507 successful, and the access re-allowing module 331 re-allows 509 access to the confidential information 305 on the mobile computing device 210. On the other hand, responsive to the current geo-location 319 of the mobile computing device 210 not being an authorized geo-location 321 associated with the specific user, the reauthorization attempt is adjudicated 511 unsuccessful, and the access re-allowing module 331 does not re-allow 513 access to the confidential information 305.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for blocking unauthorized access to confidential information stored on a specific user's mobile computing device, even to a party that has physical control of the mobile computing device and enters any user identifiers and passwords associated with accessing the confidential information, the method comprising:

generating a trigger indicating to prevent access only to the confidential information in response to receiving user-entered input indicating to execute a confidential information protection process;

receiving, by the mobile computing device, the trigger indicating to prevent access to the confidential information on the mobile computing device;

responsive to receiving the trigger, preventing access to the confidential information on the mobile computing device by any party, until a successful reauthorization by the specific user from an authorized, geo-location associated with the specific user has occurred;

responsive to receiving a directive from a user indicating to initiate a reauthorization attempt, attempting to reauthorize to access the confidential information on the mobile computing device, the attempt to reauthorize only being successful responsive to a current geo-location of the mobile computing device at a time of the attempt to reauthorize being an authorized geo-location associated with the specific user; and only in response to the attempt to reauthorize being successful, re-allowing access to the confidential information on the mobile computing device.

2. The method of claim 1 wherein:
the confidential information further comprises encrypted confidential information; and wherein
preventing access to the confidential information on the mobile computing device by any party further comprises:
removing a key required to decrypt the encrypted confidential information.

3. The method of claim 2 wherein removing the key required to decrypt the encrypted confidential information further comprises:
physically removing the key required to decrypt the confidential information from the mobile computing device.

4. The method of claim 2 wherein removing the key required to decrypt the encrypted confidential information further comprises:
programmatically making the key required to decrypt the confidential information inaccessible.

5. The method of claim 2 wherein re-allowing access to the confidential information on the mobile computing device only in response to the attempt to reauthorize being successful further comprises:
providing the key required to decrypt the encrypted confidential information, responsive to the current geo-location of the mobile computing device at the time of the attempt to reauthorize being an authorized geo-location associated with the specific user.

6. The method of claim 5 wherein providing the key required to decrypt the encrypted confidential information further comprises:
receiving, by the mobile computing device, a transmission of the key required to decrypt the confidential information from a remote computer.

7. The method of claim 5 wherein providing the key required to decrypt the encrypted confidential information further comprises:
programmatically making the key required to decrypt the confidential information accessible locally on the mobile computing device.

8. The method of claim 1 wherein preventing access to confidential information on the mobile computing device by any party further comprises:
programmatically preventing any party from reading confidential information on the mobile computing device.

9. The method of claim 1 wherein preventing access to confidential information on the mobile computing device by any party further comprises:
programmatically preventing any party from executing confidential information on the mobile computing device.

10. The method of claim 1 wherein attempting to reauthorize to access the confidential information on the mobile computing device further comprises:
determining the current geo-location of the mobile computing device at the time of the attempt to reauthorize;
transmitting a reauthorization request to a remote computer, the re-authorization request comprising an identifier of the specific user, an associated password and the current geo-location of the mobile computing device at the time of the attempt to reauthorize; and
in response to a) the password and user identifier being correct and to b) the current geo-location of the mobile computing device at the time of the attempt to reauthorize being an authorized geo-location associated with the specific user, receiving an indication from the remote computer that the attempt to reauthorize is successful.

11. The method of claim 1 wherein attempting to reauthorize to access the confidential information on the mobile computing device further comprises:
determining the current geo-location of the mobile computing device at the time of the attempt to reauthorize;
transmitting a reauthorization request to a remote computer, the re-authorization request comprising an identifier of the specific user, an associated password and the current geo-location of the mobile computing device at the time of the attempt to reauthorize; and
in response to the current geo-location of the mobile computing device at the time of the attempt to reauthorize not being an authorized geo-location associated with the specific user, receiving an indication from the remote computer that the attempt to reauthorize is not successful.

12. The method of claim 1 wherein attempting to reauthorize to access the confidential information on the mobile computing device further comprises:
determining the current geo-location of the mobile computing device at the time of the attempt to reauthorize;
comparing the current geo-location of the mobile computing device at the time of the attempt to reauthorize to at least one authorized geo-location associated with the specific user; and
in response to a) the password and user identifier being correct and to b) the current geo-location of the mobile computing device at the time of the attempt to reauthorize being an authorized geo-location associated with the specific user, adjudicating the attempt to reauthorize as successful.

13. The method of claim 1 wherein attempting to reauthorize to access the confidential information on the mobile computing device further comprises:
determining the current geo-location of the mobile computing device at the time of the attempt to reauthorize;
comparing the current geo-location of the mobile computing device at the time of the attempt to reauthorize to at least one authorized geo-location associated with the specific user; and
in response to the current geo-location of the mobile computing device at the time of the attempt to reauthorize not being an authorized geo-location associated with the specific user, adjudicating the attempt to reauthorize as unsuccessful.

14. The method of claim 1 further comprising:
generating the trigger indicating to prevent access to the confidential information automatically, in response to determining that the mobile computing device is located within a specific proximity to an insecure location.

15. The method of claim 1 wherein:
an authorized geo-location associated with the specific user further comprises a geo-location to which the specific user has access but that is not publically accessible, and at which it has been pre-determined that the specific user is permitted to reauthorize and thus access otherwise un-accessible confidential information on the mobile computing device.

16. The method of claim 1 wherein:
at least one authorized geo-location associated with the specific user consists of at least one geo-location from a group of geo-locations consisting of: a home of the specific user, an office of the specific user, a specific field office at which the specific user is scheduled to work during a specific business trip and a specific hotel at which the specific user is scheduled to stay during a specific trip.

17. The method of claim 1 further comprising:
responsive to a change concerning the specific user, performing at least one step concerning at least one authorized geo-location associated with the specific user from a group of steps consisting of: adding at least one authorized geo-location associated with the specific user, editing at least one authorized geo-location associated with the specific user and deleting at least one authorized geo-location associated with the specific user.

18. The method of claim 1 wherein preventing access to the confidential information on the mobile computing device by any party further comprises:
encrypting the confidential information on the mobile computing device; and
removing a key required to decrypt the encrypted confidential information.

19. At least one non-transitory computer readable-storage medium for blocking unauthorized access to confidential information stored on a specific user's mobile computing device, even to a party that has physical control of the mobile computing device and enters any user identifiers and passwords associated with accessing the confidential information, the at least one non-transitory computer readable-storage medium storing computer executable instructions that, when loaded into computer memory and executed by at least one processor of a computing device, cause the computing device to perform the following steps:
generating a trigger indicating to prevent access only to the confidential information in response to receiving user-entered input indicating to execute a confidential information protection process;
receiving, by the mobile computing device, the trigger indicating to prevent access to the confidential information on the mobile computing device;
responsive to receiving the trigger, preventing access to the confidential information on the mobile computing device by any party, until a successful reauthorization by the specific user from an authorized, geo-location associated with the specific user has occurred;
responsive to receiving a directive from a user indicating to initiate a reauthorization attempt, attempting to reauthorize to access the confidential information on the mobile computing device, the attempt to reauthorize only being successful responsive to a current geo-location of the mobile computing device at a time of the attempt to reauthorize being an authorized geo-location associated with the specific user; and
only in response to the attempt to reauthorize being successful, re-allowing access to the confidential information on the mobile computing device.

20. A computer system for blocking unauthorized access to confidential information stored on a specific user's mobile computing device, even to a party that has physical control of the mobile computing device and enters any user identifiers and passwords associated with accessing the confidential information, the computer system comprising:
system memory;
a trigger generating module residing in the computer memory, the trigger generating module being programmed to generate a trigger indicating to prevent access only to the confidential information in response to receiving user-entered input indicating to execute a confidential information protection process;
a trigger receiving module residing in the computer memory, the trigger receiving module being programmed to receive the trigger indicating to prevent access to the confidential information on the mobile computing device;
an access preventing module residing in the computer memory, the access preventing module being programmed to prevent access to the confidential information on the mobile computing device by any party until a successful reauthorization by the specific user from an authorized, geo-location associated with the specific user has occurred;
a reauthorization attempting module residing in the computer memory, the reauthorization attempting module being programmed, responsive to receiving a directive from a user indicating to initiate a reauthorization attempt, to attempt to reauthorize to access the confidential information on the mobile computing device, the attempt to reauthorize only being successful responsive to a current geo-location of the mobile computing device at a time of the attempt to reauthorize being an authorized geo-location associated with the specific user; and
an access re-allowing module residing in the computer memory, the access re-allowing module being programmed to re-allow access to the confidential information on the mobile computing device, only in response to the attempt to reauthorize being successful.

* * * * *